US012625628B2

(12) United States Patent
Choi

(10) Patent No.:  US 12,625,628 B2
(45) Date of Patent:     May 12, 2026

(54) CONTROLLER AND STORAGE DEVICE

(71) Applicant: SK hynix Inc., Icheon-si (KR)

(72) Inventor: Baek Gyun Choi, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/651,371

(22) Filed: Apr. 30, 2024

(65) Prior Publication Data

US 2025/0190128 A1     Jun. 12, 2025

(30) Foreign Application Priority Data

Dec. 12, 2023     (KR) ......................... 10-2023-0179399

(51) Int. Cl.
G06F 3/00          (2006.01)
G06F 3/06          (2006.01)
(52) U.S. Cl.
CPC .......... G06F 3/0631 (2013.01); G06F 3/0604 (2013.01); G06F 3/0656 (2013.01); G06F 3/0673 (2013.01)
(58) Field of Classification Search
None
See application file for complete search history.

(56) References Cited

U.S. PATENT DOCUMENTS

2019/0227938 A1     7/2019  Gopalakrishnan et al.
2023/0129363 A1     4/2023  Wei

FOREIGN PATENT DOCUMENTS

| CN | 120144044 A | * | 6/2025 | ............ G06F 3/0611 |
| EP | 2307964 B1 | | 1/2014 | |
| KR | 20200116373 A | | 10/2020 | |
| KR | 20210023184 A | | 3/2021 | |

OTHER PUBLICATIONS

Extended European Search Report for EP Appl. No. 24215767.5, mailed on Apr. 30, 2025, 8 pages.

* cited by examiner

*Primary Examiner* — Midys Rojas
(74) *Attorney, Agent, or Firm* — Perkins Coie LLP

(57)          ABSTRACT
Data storage devices and controllers are disclosed. In an embodiment of the disclosed technology, an occupied logical memory address for loading an overlay code stored in a memory into a buffer memory is allocated and set in advance, and the loading of the overlay code is performed using the occupied logical memory address. Therefore, the overlay code can be loaded without allocating in advance a buffer area of the buffer memory, and thus the buffer memory may be efficiently used and the loading of the overlay code may be effectively performed.

20 Claims, 10 Drawing Sheets

CONTROLLER AND STORAGE DEVICE

CROSS-REFERENCE TO RELATED APPLICATION

This patent document claims the priority and benefits of Korean Patent Application No. 10-2023-0179399 filed in on Dec. 12, 2023, which is incorporated herein by reference in its entirety.

TECHNICAL FIELD

Various embodiments of the disclosed technology generally relate to a controller and a storage device.

BACKGROUND

A storage device may include a memory device each of which includes a plurality of memory cells configured to store data. The storage device may include a controller that controls operations of the memory, such as writing or reading data to or from the memory device or erasing data stored in the memory.

For example, the controller may control the memory by executing firmware. In some cases, the firmware may be stored in the one or more memory device included in the storage device.

SUMMARY

Various embodiments of the disclosed technology are directed to providing measures capable of efficiently using a buffer area available to be used by a controller included in a storage device and improving the operation efficiency of firmware loaded into the buffer area.

In an embodiment, a storage device may include: a first memory configured to store a plurality of codes including a plurality of overlay codes and a plurality of non-overlay codes, wherein the plurality of non-overlay codes is used more frequently than the plurality of overlay codes; a second memory including a plurality of buffer areas configured to be loaded with the plurality of codes; and a controller configured to: allocate, in advance, at least one occupied logical memory address for loading the plurality of codes; connect a first occupied logical memory address of the at least one occupied logical memory address to at least one of the plurality of buffer areas upon loading a first overlay code of the plurality of overlay codes; and load the first overlay code into the at least one buffer area connected to the first occupied logical memory address.

In an embodiment, a controller may include: a buffer memory including a plurality of buffer areas configured to be loaded with a plurality of codes; and a processor configured to: allocate, in advance, at least one occupied logical memory address in the buffer memory for loading the plurality of codes; connect a first occupied logical memory address to at least one of the plurality of buffer areas upon loading a first code; and load the first code into the at least one buffer area connected to the first occupied logical memory address.

In an embodiment, a controller may be configured to: allocate in advance at least one occupied logical memory address used for loading a plurality of overlay codes; and upon loading at least one of the plurality of overlay codes, load the at least one overlay code into at least one first buffer area connected to the at least one occupied logical memory address, wherein the plurality of non-overlay codes is used by the controller more frequently than the plurality of overlay codes.

In an embodiment, a storage device may include: a first memory configured to store a plurality of codes which include a plurality of overlay codes and a plurality of non-overlay codes; a second memory including a plurality of buffer areas into which the plurality of codes are loaded; and a controller configured to set at least one occupied logical memory address which is allocated in advance for loading the plurality of codes, connect a first occupied logical memory address to at least one of the plurality of buffer areas when loading a first overlay code, and load the first overlay code into the at least one buffer area which is connected to the first occupied logical memory address.

In an embodiment, a controller may include: a buffer memory including a plurality of buffer areas into which a plurality of codes are loaded; and a processor configured to set at least one occupied logical memory address which is allocated in advance for loading the plurality of codes, connect a first occupied logical memory address to at least one of the plurality of buffer areas when loading a first code, and load the first code into the at least one buffer area which is connected to the first occupied logical memory address.

In an embodiment, a controller may be configured to allocate and set in advance at least one occupied logical memory address used for loading a plurality of overlay codes, and when loading at least one of the plurality of overlay codes, load the at least one overlay code into at least one first buffer area which is connected to the at least one occupied logical memory address.

According to an embodiments of the disclosed technology, it is possible to efficiently use a buffer area used by a controller and improve the operation efficiency of firmware executed by being loaded into the buffer area.

BRIEF DESCRIPTION OF THE DRAWINGS

FIGS. 3 to 5 are diagrams illustrating an example of how to load overlay codes stored in the memory into the buffer memory in the storage device based on an embodiment of the disclosed technology.

FIGS. 8 to 10 are diagrams illustrating an example of how to load overlay codes and non-overlay codes stored in the memory into the buffer memory in the storage device based on an embodiment of the disclosed technology.

DETAILED DESCRIPTION

When execution of the firmware is required, the controller may load the firmware stored in the memory device into a buffer area and execute it. However, there may not be sufficient buffer area available to the controller, and loading the firmware may be difficult, which may negatively impact the operating efficiency of the firmware.

The disclosed technology can be implemented in some embodiments to address these issues by efficiently using buffer areas of a buffer memory when loading a firmware code.

Figure 1:
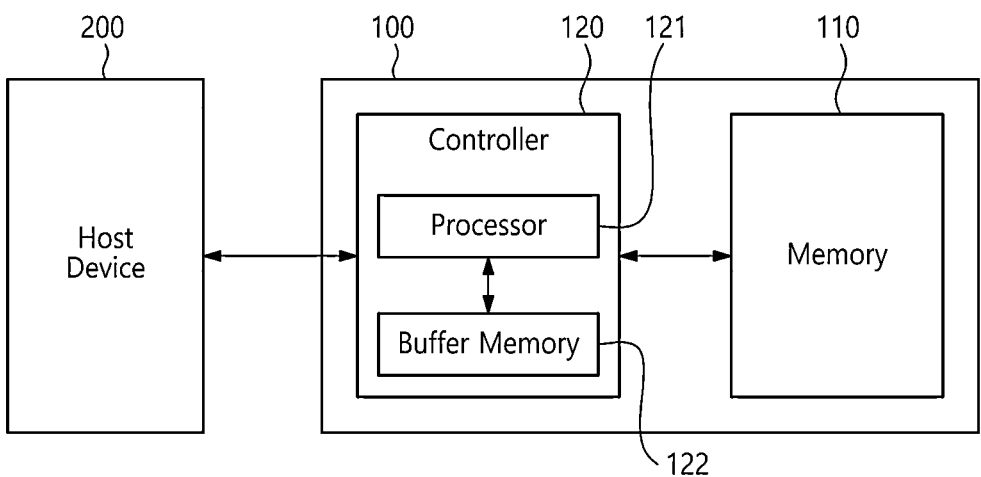
FIG. 1 is a diagram illustrating an example configuration of a storage device based on an embodiment of the disclosed technology.

FIG. 1 is a diagram illustrating an example configuration of a storage device 100 based on an embodiment of the disclosed technology.

Referring to FIG. 1, the storage device 100 based on an embodiment of the disclosed technology may include at least one memory 110. The storage device 100 may include a controller 120 that controls the operation of the at least one memory 110 and functions as an interface between the at least one memory 110 and a host device 200 which may be a computer or other computing devices.

The memory 110 may be a nonvolatile memory. For example, the memory 110 may be implemented in various types such as a NAND flash memory, a 3D NAND flash memory, a NOR flash memory, a resistive random access memory, a phase-change random access memory, a magnetoresistive random access memory, a ferroelectric random access memory and a spin transfer torque random access memory. The memory 110 may be implemented in a three-dimensional array structure.

In an embodiment of the disclosed technology, the nonvolatile memory may be a flash memory that includes a charge storage layer. In one example, the charge storage layer may be a floating gate. In another example, the charge storage layer may be an insulating material layer (e.g., insulating film). In this case, the flash memory may be referred to as a charge trap flash.

The memory 110 may operate in response to control signals from the controller 120. Operations of the memory 110 may include, for example, a program operation (also referred to as a "write operation"), an erase operation and a read operation.

The controller 120 may control program, erase, read and background operations that are performed on the memory 110.

Examples of the background operation may include garbage collection, wear leveling, read reclaim and bad block management operations.

In an implementation, the controller 120 may control the operation of the memory 110 according to a request of a device located outside the storage device 100. In another implementation, the controller 120 may control the operation of the memory 110 regardless of a request from the outside.

For example, the controller 120 may control the operation of the memory 110 according to a request of the host device 200. The storage device 100 and the host device 200 may be collectively referred to as a computing system.

The host device 200 may be a computing device in various configurations. For example, the host device 200 may be or may include a computer such as a personal computer (PC), an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, electronic devices configuring a home network, electronic devices configuring a telematics network, a radio frequency identification (RFID) device, a device (e.g., a vehicle, a robot or a drone) that can operate under human control or autonomously. In some implementations, the host device 200 may be a virtual/augmented reality device which provides a 2D or 3D virtual reality image or augmented reality image. In some implementations, the host device 200 may be any electronic device that requires a data storage device such as the storage device 100 to store data.

The host device 200 may include at least one operating system. The operating system may manage and control overall functions and operations of the host device 200, and may control operations associated with interactions between the host device 200 and the storage device 100. The operating system may be classified into a general operating system and a mobile operating system depending on the mobility of the host device 200.

In an implementation, the controller 120 and the host device 200 may be separate devices. In another implementation, the controller 120 and the host device 200 may be incorporated into a single device. In some embodiments discussed below, for the sake of convenience in explanation, it will be described as an example that the controller 120 and the host device 200 are separate devices.

The controller 120 may include a host interface which provides an interface for communication with the host device 200. The controller 120 may include a memory interface which provides an interface for communication with the memory 110.

The controller 120 may include a processor 121 as shown in FIG. 1 that controls overall operations of the controller 120. The processor 121 may include a working memory used for the operation of the processor 121, and in some implementations, may optionally include an error detection and correction circuit. Alternatively, the working memory may be positioned outside of the processor 121.

The processor 121 may communicate with the host device 200 through the host interface, and may communicate with the memory 110 through the memory interface.

The processor 121 may interpret a command from the host device 200 and/or transfer the command to the memory 110.

For example, the processor 121 may include a flash translation layer or may correspond to a flash translation layer. The processor 121 may translate a logical block address provided by the host device 200 into a physical block address. The processor 121 may receive a logical block address and translate the logical block address into a physical block address using a mapping table.

The processor 121 may control the operation of the controller 120 by executing, for example, firmware. Operations of the storage device 100 based on an embodiment of the disclosed technology may be implemented in such a way that the processor 121 executes firmware in which the corresponding operation is defined.

In some implementations, firmware is a program that is executed in the storage device 100 to drive or operate the storage device 100, may include various functional layers corresponding to the processor 121 described above. For example, the firmware may include binary data in which codes for executing the respective functional layers are defined.

For example, the firmware may be loaded into the working memory from the memory 110 or a separate nonvolatile memory (e.g., a ROM or a NOR Flash) located outside the memory 110. When executing a booting operation after power-on, the processor 121 may first load all or part of the firmware in the working memory.

In order to control overall operations of the controller 120, the processor 121 may perform a logic operation that is defined in the firmware loaded into the working memory. According to a result of performing the logic operation defined in the firmware, the processor 121 may control the controller 120 to generate a command or a signal. When a part of firmware in which a logic operation to be performed is defined is not loaded in the working memory, the processor 121 may generate an event (e.g., an interrupt) for loading the corresponding part of the firmware in the working memory.

The working memory may store firmware, program codes, commands or data necessary to drive the controller 120. The working memory may be located inside or outside the controller 120.

In some implementations, working memories may be located inside and outside the controller 120.

The working memory may be a buffer memory 122 shown in FIG. 1. Alternatively, the working memory may be disposed separately from the buffer memory 122 shown in FIG. 1. FIG. 1 illustrates an example where the buffer memory 122 is located inside the controller 120, but in some implementations, the buffer memory 122 may be located outside the controller 120.

In some implementations, the working memory or the buffer memory 122 may be a volatile memory such as an SRAM (static RAM), a DRAM (dynamic RAM) and an SDRAM (synchronous DRAM).

Figure 2:
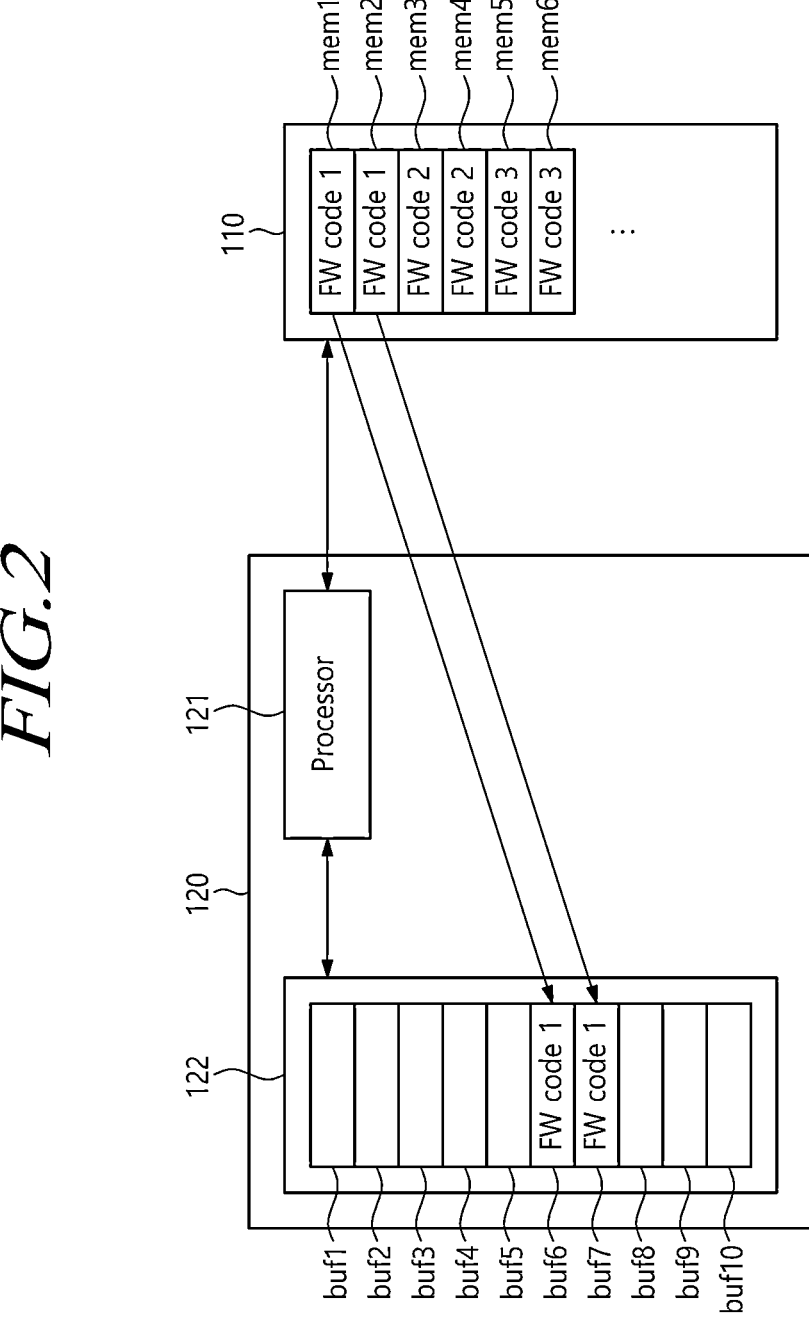
FIG. 2 is a diagram illustrating an example of how to load codes stored in a memory into a buffer memory in the storage device based on an embodiment of the disclosed technology.

FIG. 2 is a diagram illustrating an example of how to load codes stored in the memory 110 into the buffer memory 122 in the storage device 100 based on an embodiment of the disclosed technology.

Referring to FIG. 2, the memory 110 included in the storage device 100 may include a plurality of memory areas. Some of the memory areas included in the memory 110 may be areas designated as areas for storing firmware. The firmware may be stored in the form of binary data, and, for example, may be defined in the form of codes.

For example, a first firmware code may be stored in a first memory area mem1 and a second memory area mem2. A second firmware code may be stored in a third memory area mem3 and a fourth memory area mem4. A third firmware code may be stored in a fifth memory area mem5 and a sixth memory area mem6.

In some implementations, the processor 121 may load a code stored in the memory 110 into the buffer memory 122 included in the controller 120. In some embodiments of the disclosed technology, the memory 110 may be referred to as a first memory, and the buffer memory 122 may be referred to as a second memory.

The buffer memory 122 may include a plurality of buffer areas, and FIG. 2 illustrates as an example 10 buffer areas buf1, . . . and buf10.

For example, when loading of the first firmware code is required, buffer areas of the buffer memory 122 may be allocated to the processor 121. For example, a sixth buffer area buf6 and a seventh buffer area buf7 of the buffer areas included in the buffer memory 122 may be allocated to the processor 121.

The processor 121 may load the first firmware code stored in the first memory area mem1 and the second memory area mem2 of the memory 110 into the sixth buffer area buf6 and the seventh buffer area buf7 of the buffer memory 122. The processor 121 may control the operation of the memory 110 or the storage device 100 by executing the first firmware code loaded into the buffer memory 122.

When use of the first firmware code by the processor 121 is completed, the sixth buffer area buf6 and the seventh buffer area buf7 into which the first firmware code is loaded may be deallocated or released. The sixth buffer area buf6 and the seventh buffer area buf7 may be used to load other data.

The buffer areas of the buffer memory 122 may be used to load data other than firmware codes. The disclosed technology can be implemented in some embodiments to improve the operation efficiency of the firmware by efficiently using the buffer areas of the buffer memory 122 when loading a firmware code.

Figure 3:
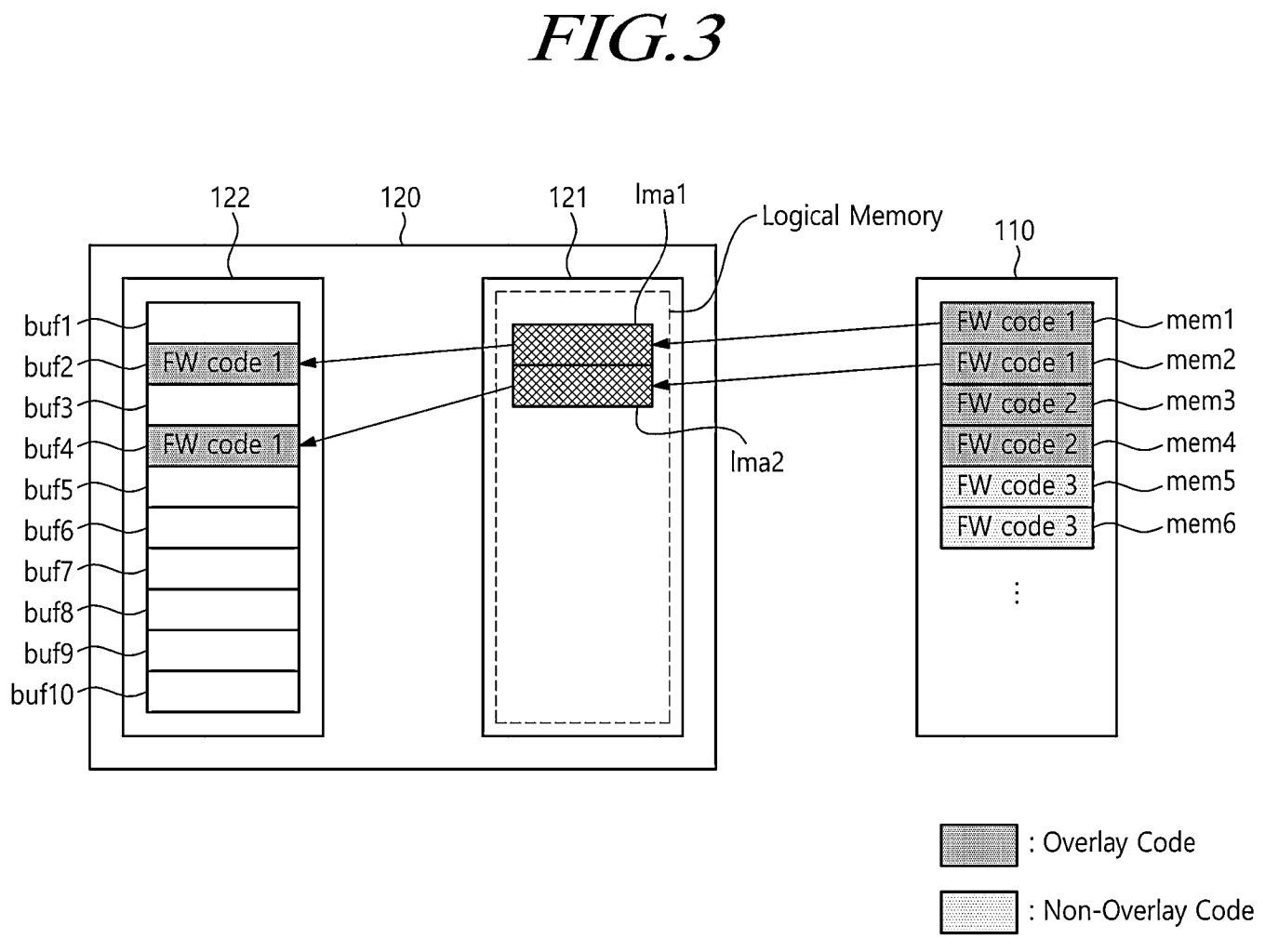
Figure 4:
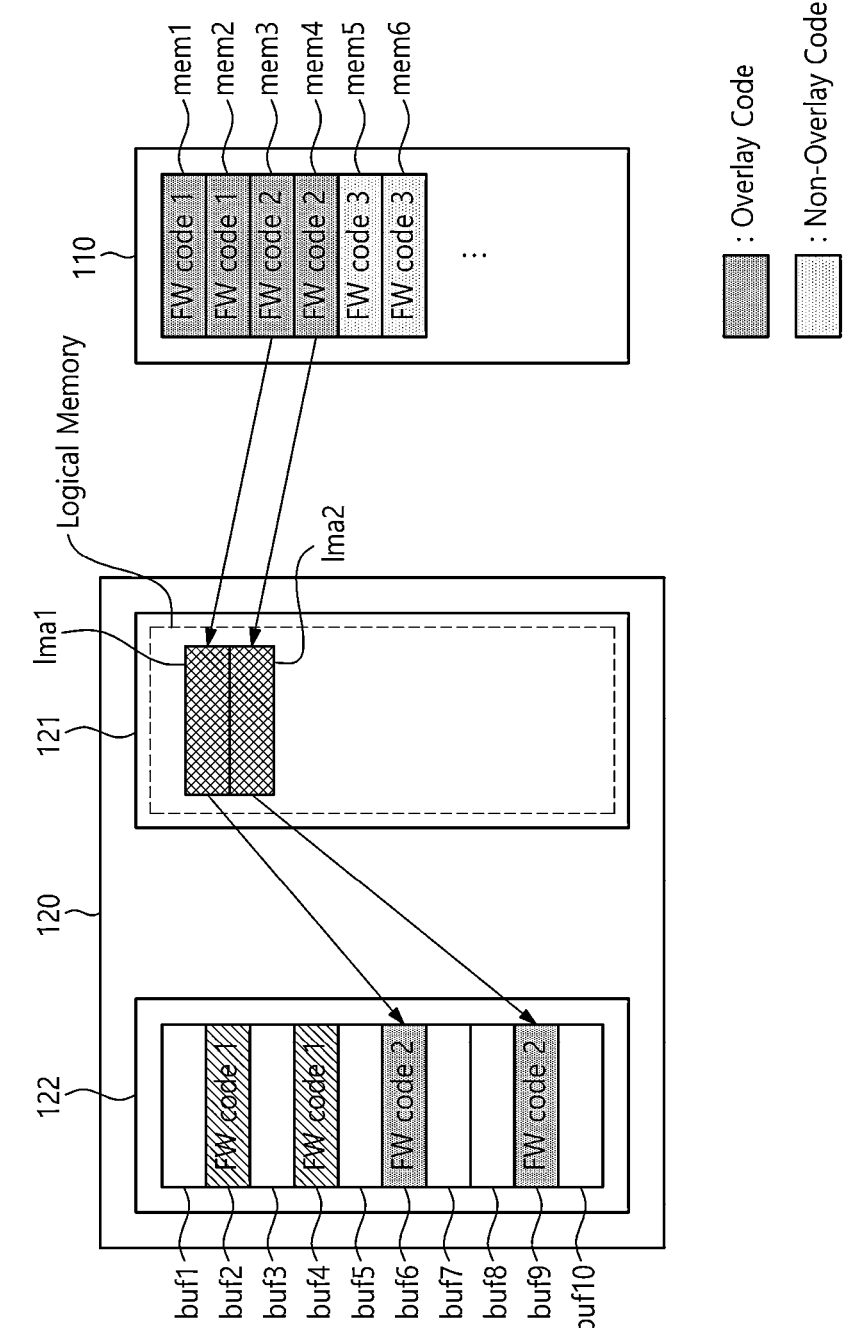
Figure 5:
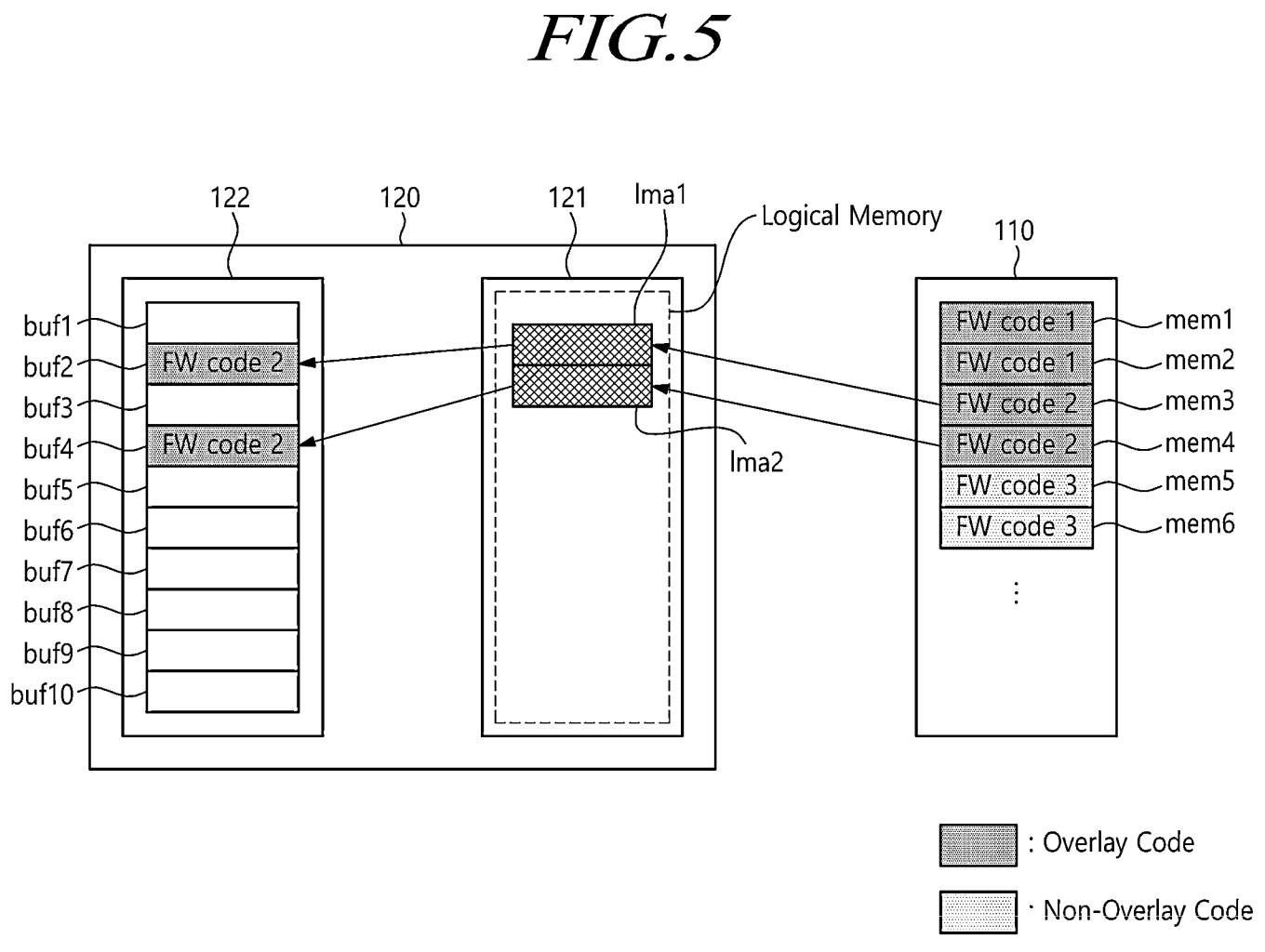

FIGS. 3 to 5 are diagrams illustrating an example of how to load overlay codes stored in the memory 110 into the buffer memory 122 in the storage device 100 based on an embodiment of the disclosed technology.

Referring to FIG. 3, when allocating a buffer area for loading a firmware code, the controller 120 may allocate a buffer area of the buffer memory 122 using a logical memory address. The disclosed technology can be implemented in some embodiments to be applied to a case where a firmware code is loaded into the buffer memory 122, or a case where data other than a firmware code is loaded by being allocated a buffer area of the buffer memory 122.

Firmware codes may be stored in some of the memory areas of the memory 110 included in the storage device 100. FIG. 3 illustrates, as an example, a case where firmware codes are stored in six memory areas.

The buffer memory 122 included in the controller 120 of the storage device 100 may provide the plurality of buffer areas. In some implementations, the buffer memory 122 is located outside the controller 120.

In some implementations, a buffer area for loading a firmware code may be allocated to the processor 121 included in the controller 120 of the storage device 100, using a logical memory address. The processor 121 may classify firmware codes depending on the type or the frequency of use of the firmware codes, and may differently control the setting of logical memory addresses for the firmware codes.

In some implementations, the processor 121 may classify firmware codes into overlay codes and non-overlay codes. In some implementations, the term "overlay code" can be used to indicate a firmware code that is not used frequently. In some implementations, the term "non-overlay code" can be used to indicate a firmware code that is used frequently.

In some implementations, a non-overlay code may be a firmware code loaded into the buffer memory 122 when the storage device 100 is booted. In some implementations, a non-overlay code may be a firmware code that is continuously loaded into the buffer memory 122 during the operation of the storage device 100. In some implementations, a non-overlay code may be a firmware code whose period or frequency of being loaded into the buffer memory 122 during the operation of the storage device 100 is longer or more frequent than a predetermined value.

In some implementations, an overlay code may be a firmware code whose period or frequency of being used is shorter or less frequent than a non-overlay code. In some implementations, an overlay code may be a firmware code whose period or frequency of being loaded into the buffer memory 122 during the operation of the storage device 100 is shorter or less frequent than a predetermined value.

The processor 121 of the controller 120 may allocate in advance a logical memory address to be used to load an overlay code into the buffer memory 122. For example, the processor 121 may allocate in advance at least one occupied logical memory address Ima and set the at least one occupied logical memory address Ima as a logical memory address to be used to load an overlay code.

The occupied logical memory address Ima may be a fixed logical memory address. The occupied logical memory address Ima may be a logical memory address that is used to load an overlay code, and may be used to load each of a plurality of overlay codes.

For example, referring to FIG. 3, the processor 121 may allocate in advance a first occupied logical memory address Ima1 and a second occupied logical memory address Ima2 as logical memory addresses for loading an overlay code. Occupied logical memory addresses Ima may be set in various ways depending on the size of a firmware code, and FIG. 3 illustrates an example where two occupied logical memory addresses Ima are allocated to load one firmware code.

In some implementations, the first occupied logical memory address Ima1 and the second occupied logical memory address Ima2 not be connected to buffer areas included in the buffer memory 122. Even though the first occupied logical memory address Ima1 and the second occupied logical memory address Ima2 are allocated in advance, since they are not connected to buffer areas of the buffer memory 122, the buffer areas of the buffer memory 122 may not be allocated for loading a firmware code.

When a situation requiring loading of the first firmware code among the overlay codes occurs, the processor 121 may allocate buffer areas of the buffer memory 122 for the first occupied logical memory address Ima1 and the second occupied logical memory address Ima2. The buffer areas allocated for the first occupied logical memory address Ima1 and the second occupied logical memory address Ima2 may be consecutive or nonconsecutive. The buffer areas allocated for the first occupied logical memory address Ima1 and the second occupied logical memory address Ima2 may be indicated by, for example, buffer IDs. Alternatively, the buffer areas allocated for the first occupied logical memory address Ima1 and the second occupied logical memory address Ima2 may be indicated by buffer IDs and a plurality of slots included in each buffer ID. For example, one buffer ID and a plurality of slots may be allocated to one occupied logical memory address Ima, but the disclosed technology is not limited thereto.

For example, a second buffer area buf2 and a fourth buffer area buf4 included in the buffer memory 122 may be allocated to the first occupied logical memory address Ima1 and the second occupied logical memory address Ima2.

The processor 121 may connect the first occupied logical memory address Ima1 and the second occupied logical memory address Ima2 to the second buffer area buf2 and the fourth buffer area buf4, respectively.

The processor 121 may load the first firmware code, which is an overlay code, into the second buffer area buf2 connected to the first occupied logical memory address Ima1 and the fourth buffer area buf4 connected to the second occupied logical memory address Ima2.

Since the period or frequency of use of an overlay code is not relatively long or frequent, the processor 121 may load the overlay code using only the occupied logical memory addresses Ima, which are allocated in advance. An overlay code may be loaded into buffer areas connected to occupied logical memory addresses Ima, through the occupied logical memory addresses Ima, and in this way, loading of the plurality of overlay codes may be efficiently managed.

Since occupied logical memory addresses Ima are not connected to buffer areas included in the buffer memory 122 before an overlay code is loaded, the buffer memory 122 may not allocate in advance buffer areas for loading an overlay code. In this way, allocation of the buffer areas included in the buffer memory 122 may be efficiently managed.

When use of the first firmware code loaded into the buffer 122 through the first occupied logical memory address Ima1 and the second occupied logical memory address Ima2 is completed, the processor 121 may release connection between the first occupied logical memory address Ima2 and the second occupied logical memory address Ima2 and buffer areas.

For example, referring to FIG. 4, connection between the first occupied logical memory address Ima1 and the second buffer area buf2 may be released. Connection between the second occupied logical memory address Ima2 and the fourth buffer area buf4 may be released.

The second buffer area buf2 and the fourth buffer area buf4 may be managed as areas into which invalid data is loaded, and the first firmware code may be deleted from the second buffer area buf2 and the fourth buffer area buf4.

When a situation requiring loading of the second firmware code as another overlay code occurs after use of the first firmware code is completed, the processor 121 may use the first occupied logical memory address Ima1 and the second occupied logical memory address Ima2 to load the second firmware code.

The processor 121 may connect each of the first occupied logical memory address Ima1 and the second occupied logical memory address Ima2 to a buffer area included in the buffer memory 122. For example, the processor 121 may connect the first occupied logical memory address Ima1 and the second occupied logical memory address Ima2 to a sixth buffer area buf6 and a ninth buffer area buf9, respectively, included in the buffer memory 122. The processor 121 may load the second firmware code into the sixth buffer area buf6 and the ninth buffer area buf9.

Since an overlay code is loaded into buffer areas of the buffer memory 122 through occupied logical memory addresses Ima, which are allocated in advance, the size of buffer areas into which overlay codes are loaded in the buffer memory 122 may be maintained to be equal to or smaller than a predetermined size. In this way, an overlay code may be loaded by efficiently using the buffer areas of the buffer memory 122 and minimizing the impact on the loading of other data.

In order to load an overlay code, only the occupied logical memory addresses Ima are allocated in advance and buffer areas are not allocated in advance, and thus buffer areas into which an overlay code is loaded may vary depending on the point in time.

For example, as illustrated in FIG. 4, buffer areas into which the first firmware code is loaded may be different from buffer areas into which the second firmware code is loaded. When the first firmware code is loaded again into buffer areas after being completely used by being loaded into buffer areas, buffer areas into which the first firmware code is loaded at a first time point may be different from buffer areas into which the first firmware code is loaded at a second time point.

An occupied logical memory address Ima may be fixed, and buffer areas connected to an occupied logical memory address Ima may vary depending on the usage state of the buffer memory 122.

In order to load an overlay code, only the occupied logical memory addresses Ima are allocated and fixed in advance, and buffer areas of the buffer memory 122 are variably connected. Therefore, the buffer areas of the buffer memory 122 may be efficiently used.

Since the occupied logical memory addresses Ima, which are allocated in advance, are provided for loading of an overlay code and the overlay code is loaded into buffer areas of the buffer memory 122 through the occupied logical memory addresses Ima, the usage efficiency of the buffer areas according to loading of the overlay code with low frequency of use may be improved.

Since an overlay code is loaded into buffer areas through occupied logical memory addresses Ima, in some implementations, the processor 121 may maintain connection between the occupied logical memory addresses Ima and the buffer areas after use of the overlay code is completed.

For example, referring to FIG. 5, a state after, in FIG. 3, the first firmware code is loaded into buffer areas of the buffer memory 122 and use of the first firmware code is completed is illustrated as an example.

After the use of the first firmware code is completed, in some implementations, the processor 121 may maintain a connection between the first occupied logical memory address Ima1 and the second occupied logical memory address Ima2 and buffer areas without releasing it.

For example, when the remaining capacity of the buffer areas in the buffer memory 122 is equal to or larger than a preset value, the connection between the first occupied logical memory address Ima1 and the second occupied logical memory address Ima2 and buffer areas may be maintained. For example, the connection between the first occupied logical memory address Ima1 and the second buffer area buf2 and between the second occupied logical memory address Ima2 and the fourth buffer area buf4 may be maintained.

When there is a situation that requires the use of the second firmware code, which is another overlay code, after the use of the first firmware code is completed, the processor 121 may load the second firmware code into the second buffer area buf2 and the fourth buffer area buf4, which are connected to the first occupied logical memory address Ima1 and the second occupied logical memory address Ima2.

The processor 121 may enable efficient use of the buffer areas by loading an overlay code using the occupied logical memory addresses Ima, and when there is room in the buffer areas, the connection between the occupied logical memory addresses Ima and buffer areas may be maintained and the buffer areas connected to the occupied logical memory addresses Ima may be used as buffer areas for loading an overlay code.

Since the processor 121 allocates and sets in advance occupied logical memory addresses Ima and uses the occupied logical memory addresses Ima to load an overlay code, it is possible to efficiently use the buffer areas included in the buffer memory 122, efficiently perform loading of an overlay code and improve the performance of an operation of executing a firmware code.

Since the processor 121 allocates in advance and uses occupied logical memory addresses Ima for loading an overlay code, the processor 121 may use logical memory addresses other than the occupied logical memory addresses Ima to load a non-overlay code.

Figure 6:
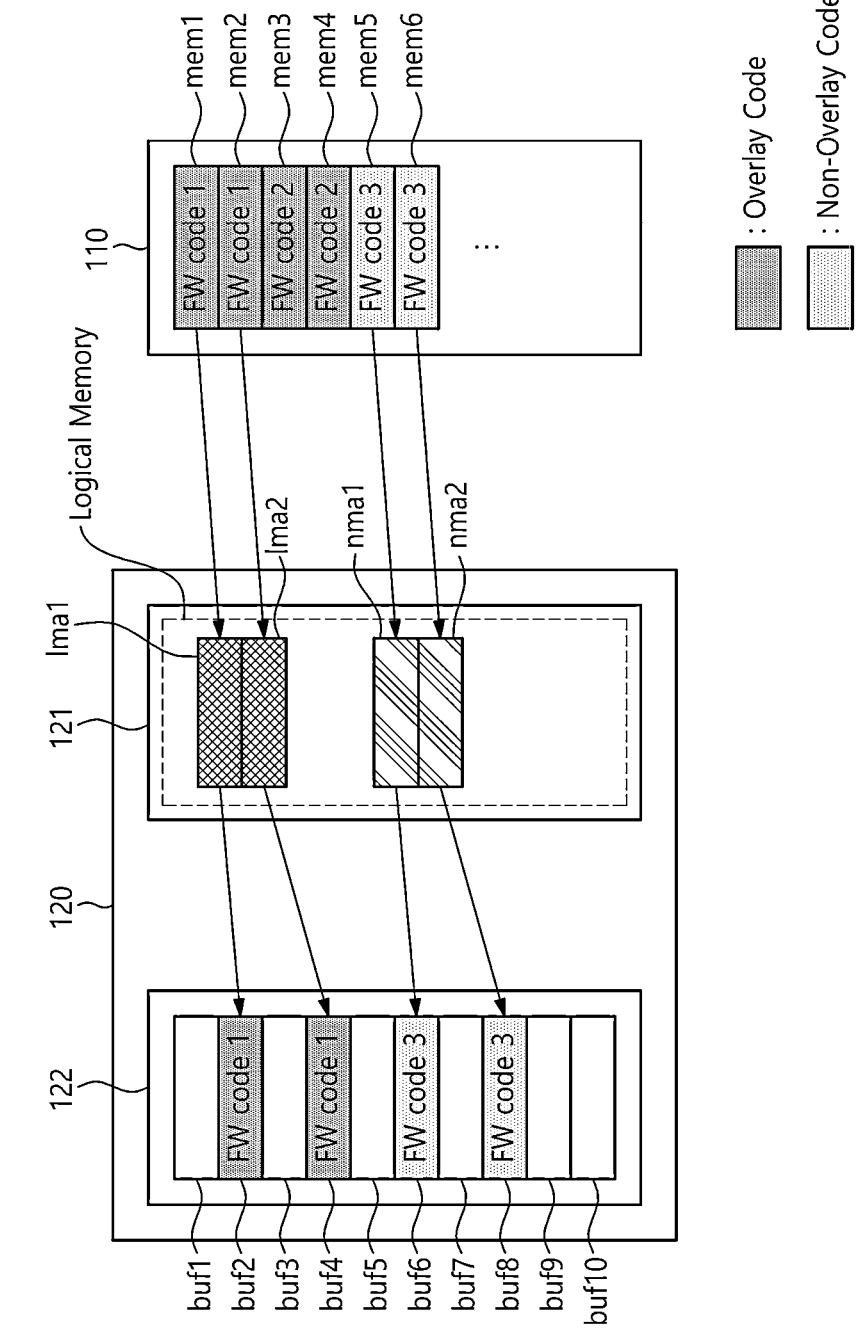
FIGS. 6 and 7 are diagrams illustrating an example of how to load non-overlay codes stored in the memory into the buffer memory in the storage device based on an embodiment of the disclosed technology.
Figure 7:
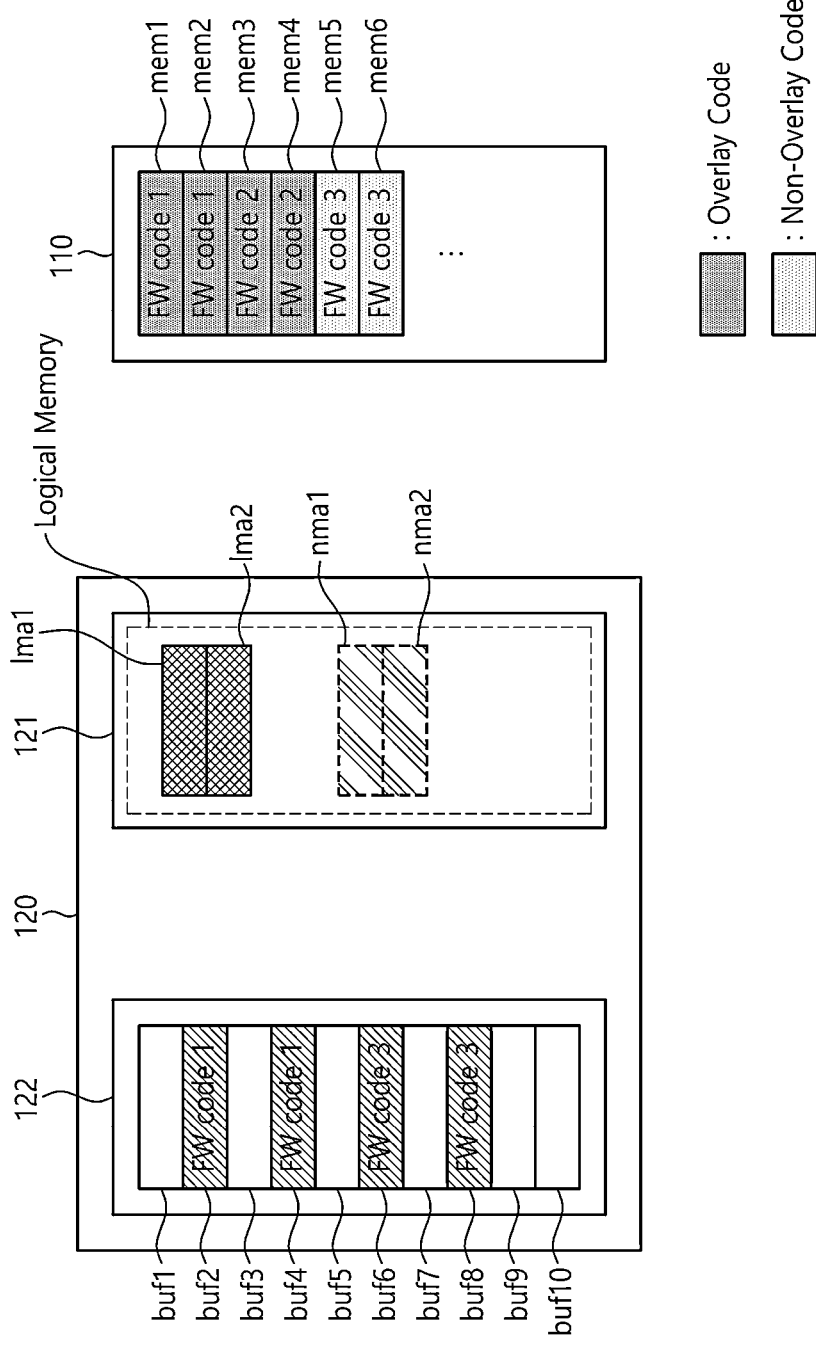

FIGS. 6 and 7 are diagrams illustrating an example of how to load non-overlay codes stored in the memory 110 into the buffer memory 122 in the storage device 100 based on an embodiment of the disclosed technology.

FIG. 6 shows an example situation where a first firmware code and a second firmware code, which are overlay codes, and a third firmware code, which is a non-overlay code, are stored in memory areas included in the memory 110.

When the loading of the first firmware code, which is an overlay code, is required, the processor 121 of the controller 120 may use the first occupied logical memory address Ima1 and the second occupied logical memory address Ima2, which are allocated in advance for loading of an overlay code.

For example, the processor 121 may connect the first occupied logical memory address Ima1 and the second occupied logical memory address Ima2 to the second buffer area buf2 and the fourth buffer area buf4 among the buffer areas included in the buffer memory 122. The processor 121 may load the first firmware code into the second buffer area buf2 and the fourth buffer area buf4 and use the first firmware code.

When the loading of the third firmware code, which is a non-overlay code, is required, the processor 121 may allocate unoccupied logical memory addresses nma to load the non-overlay code. The unoccupied logical memory addresses nma may be logical memory addresses other than the occupied logical memory addresses Ima, which are allocated in advance.

For example, in order to load the third firmware code, which is a non-overlay code, the processor 121 may allocate a first unoccupied logical memory address nma1 and a second unoccupied logical memory address nma2. The processor 121 may connect the first unoccupied logical memory address nma1 and the second unoccupied logical memory address nma2 to buffer areas included in the buffer memory 122. For example, the first unoccupied logical memory address nma1 and the second unoccupied logical memory address nma2 may be connected to the sixth buffer area buf6 and an eighth buffer area buf8, respectively, included in the buffer memory 122.

The processor 121 may load the third firmware code into the sixth buffer area buf6 and the eighth buffer area buf8, which are connected to the first unoccupied logical memory address nma1 and the second unoccupied logical memory address nma2, and may use the third firmware code.

Since the occupied logical memory addresses Ima are allocated in advance for an overlay code, the processor 121 may allocate logical memory addresses other than the occupied logical memory addresses Ima and may use the logical memory addresses to load a non-overlay code.

When the use of an overlay code or a non-overlay code loaded into the buffer memory 122 is completed, the processor 121 may release the connection between logical memory addresses and buffer areas.

For example, referring to FIG. 7, when the use of the first firmware code is completed, the processor 121 may release the connection between the first occupied logical memory address Ima1 and the second occupied logical memory address Ima2 and buffer areas. When the use of the third firmware code is completed, the processor 121 may release connection between the first unoccupied logical memory address nma1 and the second unoccupied logical memory address nma2 and buffer areas.

Buffer areas whose connection to logical memory addresses is released may be managed as having invalid data loaded, or data loaded into the corresponding buffer areas may be deleted.

After the connection between occupied logical memory addresses Ima and buffer areas is released, the processor 121 may maintain setting of the occupied logical memory addresses Ima. The processor 121 may maintain the setting of the occupied logical memory addresses Ima, and thereafter, when a situation requiring loading of an overlay code occurs, the processor 121 may load the overlay code using the occupied logical memory addresses Ima.

After the connection between unoccupied logical memory addresses nma and buffer areas is released, the processor 121 may release allocation of the unoccupied logical memory addresses nma. The processor 121 may release allocation of unoccupied logical memory addresses nma used to allocate data such as a non-overlay code, when use of the corresponding data is completed.

In an embodiment of the disclosed technology, the loading of an overlay code may be efficiently performed by using fixed occupied logical memory addresses Ima, and as logical memory addresses for loading data other than an overlay code, logical memory addresses other than the occupied logical memory addresses Ima may be used without being allocated in advance. Therefore, the buffer memory 122 may be efficiently accessed through logical memory addresses.

In addition, in an embodiment of the disclosed technology, areas into which data is loaded with consecutive addresses are managed using logical memory addresses, and buffer areas corresponding to consecutive or non-consecutive addresses are used in the buffer memory 122, which provides physical storage spaces. Therefore, buffer areas may be efficiently used depending on the usage state of the buffer memory 122.

In an embodiment of the disclosed technology, since the loading of an overlay code is performed using logical memory addresses, the loading of overlay codes may be efficiently performed using a plurality of logical memory addresses without deteriorating the usage efficiency of the buffer memory 122.

Figure 8:
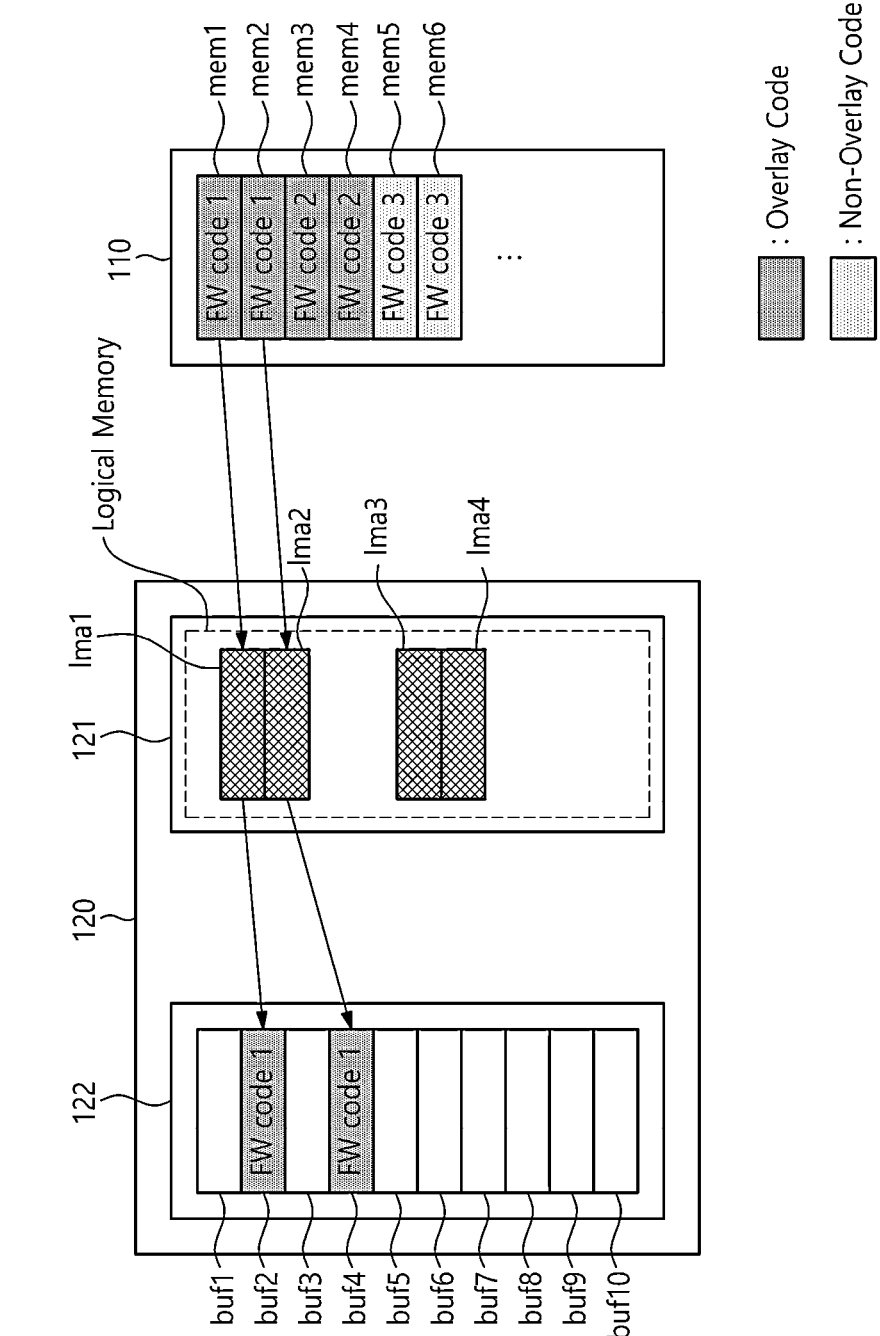
Figure 9:
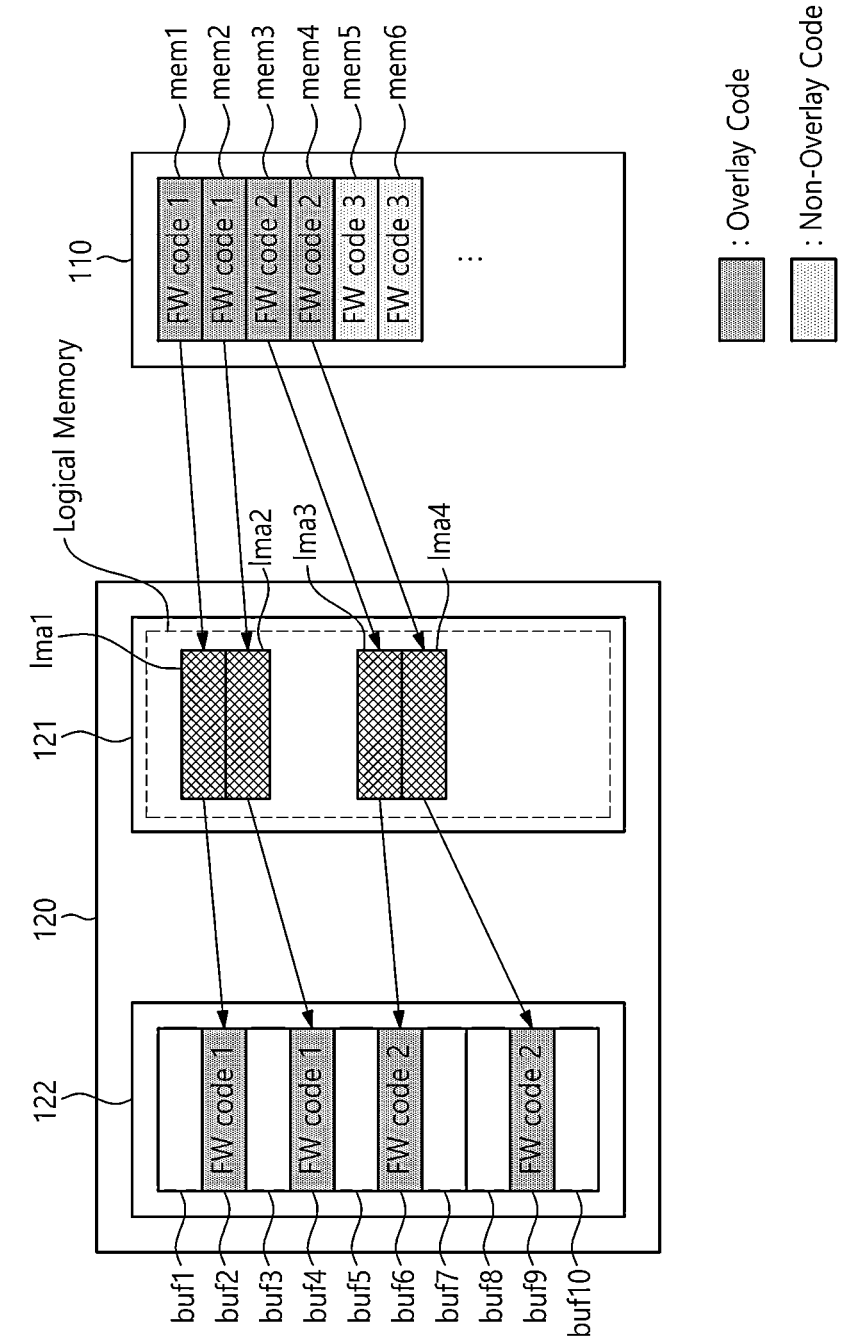
Figure 10:
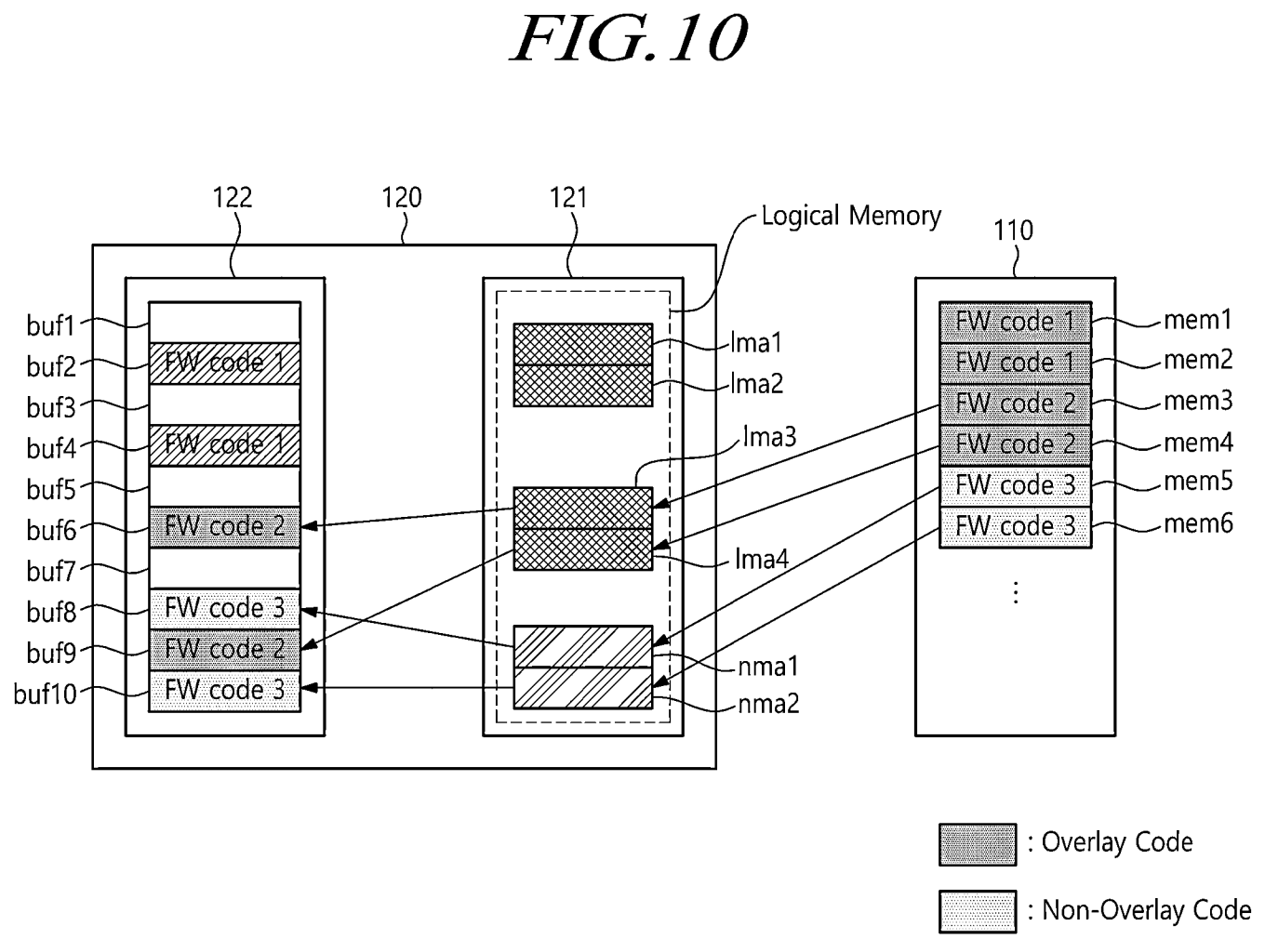

FIGS. 8 to 10 are diagrams illustrating an example of how to load overlay codes and non-overlay codes stored in the memory 110 into the buffer memory 122 in the storage device 100 based on an embodiment of the disclosed technology.

Referring to FIG. 8, the processor 121 of the controller 120 may allocate in advance two or more occupied logical memory addresses Ima for loading of an overlay code.

For example, the processor 121 may allocate in advance the first occupied logical memory address Ima1 and the second occupied logical memory address Ima2 for loading of one overlay code. The processor 121 may allocate in advance a third occupied logical memory address Ima3 and a fourth occupied logical memory address Ima4 for loading of another overlay code.

Two occupied logical memory addresses Ima may be allocated in advance for loading of one overlay code.

In some implementations, occupied logical memory addresses Ima may not be connected to buffer areas of the buffer memory 122 before an overlay code is loaded. Only occupied logical memory addresses Ima may be allocated in advance, and buffer areas of the buffer memory 122 may not be allocated in advance.

When the loading of the first firmware code, which is an overlay code, is required, the processor 121 may connect the first occupied logical memory address Ima1 and the second occupied logical memory address Ima2 to the second buffer area buf2 and the fourth buffer area buf4, respectively, included in the buffer memory 122.

The first firmware code may be loaded into the second buffer area buf2 and the fourth buffer area buf4.

When the use of the first firmware code is completed, the processor 121 may release the connection between the first occupied logical memory address Ima1 and the second occupied logical memory address Ima2 and buffer areas. In some implementations, when the use of the first firmware code is completed, the processor 121 may maintain the connection between the first occupied logical memory address Ima1 and the second occupied logical memory address Ima2 and buffer areas.

In addition to the first occupied logical memory address Ima1 and the second occupied logical memory address Ima2, the third occupied logical memory address Ima3 and the fourth occupied logical memory address Ima4 are allocated in advance for loading of an overlay code, and thus the processor 121 may maintain the connection between the first occupied logical memory address Ima1 and the second occupied logical memory address Ima2 and buffer areas, even after the use of the first firmware code is completed.

For example, referring to FIG. 9, when the loading of the second firmware code is required after the first firmware code is loaded, the processor 121 may connect the third occupied logical memory address Ima3 and the fourth occupied logical memory address Ima4 to the sixth buffer area buf6 and the ninth buffer area buf9, respectively.

The processor 121 may load the second firmware code into the sixth buffer area buf6 and the ninth buffer area buf9, which are connected to the third occupied logical memory address Ima3 and the fourth occupied logical memory address Ima4.

For example, when the loading of the second firmware code is required in a state in which the first firmware code is loaded and in use, the processor 121 may load the second firmware code into the buffer memory 122 using the third occupied logical memory address Ima3 and the fourth occupied logical memory address Ima4.

Since the occupied logical memory addresses Ima may be allocated in advance in a state in which they are not connected to buffer areas, it is possible to increase the loading efficiency of the overlay code by allocating in advance a plurality of occupied logical memory addresses Ima and using the plurality of occupied logical memory addresses Ima when loading an overlay code.

The processor 121 may determine whether to use occupied logical memory addresses Ima when loading the second firmware code, based on the remaining capacity of the buffer areas included in the buffer memory 122.

For example, when the remaining capacity of the buffer areas is equal to or larger than a preset value, the processor 121 may load the second firmware code using the third occupied logical memory address Ima3 and the fourth occupied logical memory address Ima4 as discussed above.

Alternatively, when the remaining capacity of the buffer areas is smaller than the preset value, the second firmware code may be loaded after the use of the first firmware code is completed. In this case, the loading of the second firmware code may be performed using the first occupied logical memory address Ima1 and the second occupied logical memory address Ima2, or may be performed using the third occupied logical memory address Ima3 and the fourth occupied logical memory address Ima4.

In some implementations, when the loading of the second firmware code is required in a state in which the use of the first firmware code is completed after the first firmware code is loaded, the processor 121 may load the second firmware code into the buffer memory 122 using the third occupied logical memory address Ima3 and the fourth occupied logical memory address Ima4.

After the use of the first firmware code is completed, the processor 121 may maintain the connection between the first occupied logical memory address Ima1 and the second occupied logical memory address Ima2 and buffer areas. Thereafter, when a situation requiring the use of the first firmware code occurs again, the processor 121 may use the first firmware code loaded into the buffer areas connected to the first occupied logical memory address Ima1 and the second occupied logical memory address Ima2. An operation of reading the first firmware code from the memory 110 to load the first firmware code may not be performed.

In some implementations, the processor 121 may determine whether to maintain connection between buffer areas into which the first firmware code is loaded and occupied logical memory addresses Ima based on the remaining capacity of the buffer areas included in the buffer memory 122.

For example, when the remaining capacity of the buffer areas is equal to or larger than the preset value, the processor 121 may maintain the connection between the first occupied logical memory address Ima1 and the second occupied logical memory address Ima2 and buffer areas after the use of the first firmware code is completed. When the remaining capacity of the buffer areas is smaller than the preset value, the processor 121 may release the connection between the first occupied logical memory address Ima1 and the second occupied logical memory address Ima2 and buffer areas. Buffer areas into which the first firmware code is loaded may be used to load other data.

In this way, by loading overlay codes using the plurality of occupied logical memory addresses Ima, loading efficiency of the overlay codes may be increased, and since whether to maintain connection between the plurality of occupied logical memory addresses Ima and buffer areas may vary depending on the remaining capacity of the buffer areas, the buffer areas may be efficiently utilized.

When overlay codes are loaded using the plurality of occupied logical memory addresses Ima, the loading of a non-overlay code may be performed using unoccupied logical memory addresses nma.

For example, FIG. 10 shows the use of the first firmware code loaded into buffer areas using the first occupied logical memory address Ima1 and the second occupied logical memory address Ima2 is completed, and the second firmware code loaded into buffer areas using the third occupied logical memory address Ima3 and the fourth occupied logical memory address Ima4 is in use.

When the loading of a non-overlay code is required, the processor 121 may allocate unoccupied logical memory addresses nma other than the above-described occupied logical memory addresses Ima to load the non-overlay code.

For example, the processor 121 may allocate a first unoccupied logical memory address nma1 and a second unoccupied logical memory address nma2. The first unoccupied logical memory address nma1 and the second unoccupied logical memory address nma2 may be connected to the eighth buffer area buf8 and a tenth buffer area buf10 of the buffer memory 122, respectively. A third firmware code, which is a non-overlay code, may be loaded into the eighth buffer area buf8 and the tenth buffer area buf10.

When a non-overlay code is loaded after the use of the first firmware code, which is an overlay code, is completed, whether to maintain buffer areas into which the first firmware code is loaded may be controlled depending on the remaining capacity of the buffer areas.

As illustrated in FIG. 10, when the remaining capacity of the buffer areas when loading the third firmware code is smaller than a preset value, the processor 121 may release the connection between buffer areas into which the first firmware code is loaded and occupied logical memory addresses Ima. The processor 121 may delete the first firmware code loaded into the buffer areas or label the first firmware code as invalid data.

When the remaining capacity of the buffer areas is equal to or larger than the preset value, the processor 121 may maintain the connection between buffer areas into which the first firmware code is loaded and occupied logical memory addresses Ima. When an overlay code needs to be reused, without affecting the loading of other data into the buffer memory 122, the loading of the overlay code may be performed without performing repetitive reading from the memory 110.

Only a few embodiments and examples are described. Enhancements and variations of the disclosed embodiments and other embodiments can be made based on what is described and illustrated in this patent document.

What is claimed is:

1. A storage device comprising:
   a first memory configured to store a plurality of codes including a plurality of overlay codes and a plurality of non-overlay codes, wherein the plurality of non-overlay codes is used more frequently than the plurality of overlay codes;
   a second memory including a plurality of buffer areas configured to be loaded with the plurality of codes; and
   a controller configured to: allocate, in advance, at least one occupied logical memory address for loading the plurality of codes, wherein, upon allocation, the at least one occupied logical memory address is not connected to the plurality of buffer areas; connect a first occupied logical memory address of the at least one occupied logical memory address to at least one of the plurality of buffer areas upon loading a first overlay code of the plurality of overlay codes; and load the first overlay code into the at least one buffer area connected to the first occupied logical memory address.

2. The storage device according to claim 1, wherein upon completion of use of the first overlay code, the controller releases a connection between the first occupied logical memory address and the at least one buffer area.

3. The storage device according to claim 2, wherein upon loading of a second overlay code after the completion of use of the first overlay code, the controller connects the first occupied logical memory address to at least one of the plurality of buffer areas, and loads the second overlay code into the at least one buffer area connected to the first occupied logical memory address.

4. The storage device according to claim 3, wherein the at least one buffer area loaded with the first overlay code is different from the at least one buffer area loaded with the second overlay code.

5. The storage device according to claim 2, wherein, after releasing the connection between the first occupied logical memory address and the at least one buffer area, the controller maintains a setting of the first occupied logical memory address.

6. The storage device according to claim 1, wherein, after completion of use of the first overlay code, the controller maintains a connection between the first occupied logical memory address and the at least one buffer area.

7. The storage device according to claim 6, wherein, upon loading a second overlay code, the controller loads the second overlay code into the at least one buffer area connected to the first occupied logical memory address.

8. The storage device according to claim 6, wherein, in a case that a remaining capacity of the plurality of buffer areas in the second memory is smaller than a preset value, the controller releases a connection between the first occupied logical memory address and the at least one buffer area.

9. The storage device according to claim 1, wherein, upon loading a second overlay code during a use of the first overlay code, the controller connects a second occupied logical memory address to at least one of the plurality of buffer areas, and loads the second overlay code into the at least one buffer area connected to the second occupied logical memory address.

10. The storage device according to claim 9, wherein, in a case that a remaining capacity of the plurality of buffer areas is equal to or larger than a preset value in a state in which a use of the first overlay code is completed and the second overlay code is being used, the controller maintains connection between the first occupied logical memory address and the at least one buffer area.

11. The storage device according to claim 1, wherein, upon loading at least one of the plurality of non-overlay codes, the controller allocates an unoccupied logical memory address other than the at least one occupied logical memory address, connects the unoccupied logical memory address to at least one of the plurality of buffer areas, and loads the at least one non-overlay code into the at least one buffer area connected to the unoccupied logical memory address.

12. The storage device according to claim 11, wherein the occupied logical memory address is fixed, and the unoccupied logical memory address is variable.

13. The storage device according to claim 1, wherein the at least one buffer area into which the first overlay code is loaded at a first time point is different from the at least one buffer area into which the first overlay code is loaded at a second time point.

14. A controller comprising:
 a buffer memory including a plurality of buffer areas configured to be loaded with a plurality of codes; and
 a processor configured to: allocate, in advance, at least one occupied logical memory address in the buffer memory for loading the plurality of codes, wherein, upon allocation, the at least one occupied logical memory address is not connected to the plurality of buffer areas; connect a first occupied logical memory address to at least one of the plurality of buffer areas upon loading a first code; and load the first code into the at least one buffer area connected to the first occupied logical memory address.

15. The controller according to claim 14, wherein, upon loading a second code after completion of a use of the first code, the processor loads the second code into the at least one buffer area connected to the first occupied logical memory address.

16. The controller according to claim 14, wherein, upon loading a second code during a use of the first code, the processor connects a second occupied logical memory address to at least one of the plurality of buffer areas, and loads the second code into the at least one buffer area connected to the second occupied logical memory address.

17. The controller according to claim 14, wherein, upon loading a third code, the processor connects an unoccupied logical memory address other than the at least one occupied logical memory address to at least one of the plurality of buffer areas, and loads the third code into the at least one buffer area connected to the at least one unoccupied logical memory address.

18. The controller according to claim 14, wherein the first occupied logical memory address used for loading the first code is fixed, and the at least one buffer area into which the first code is loaded is variable.

19. A controller configured to: allocate in advance at least one occupied logical memory address used for loading a plurality of overlay codes, wherein, upon allocation, the at least one occupied logical memory address is not connected to a plurality of buffer areas; and upon loading at least one of the plurality of overlay codes, load the at least one overlay code into at least one first buffer area of the plurality of buffer areas connected to the at least one occupied logical memory address, wherein a plurality of non-overlay codes is used by the controller more frequently than the plurality of overlay codes.

20. The controller according to claim 19, wherein, upon loading a non-overlay code, the controller uses an unoccupied logical memory address other than the at least one occupied logical memory address, and loads the non-overlay code into at least one second buffer area connected to the unoccupied logical memory address.

* * * * *